(12) United States Patent
Nohren, Jr.

(10) Patent No.: US 7,473,362 B1
(45) Date of Patent: Jan. 6, 2009

(54) WATER TREATMENT SYSTEM

(76) Inventor: John E. Nohren, Jr., 7947 9th Ave. South, St. Petersburg, FL (US) 33707-2732

( * ) Notice: Subject to any disclaimer, the term of this patent is extended or adjusted under 35 U.S.C. 154(b) by 0 days.

(21) Appl. No.: 12/070,789

(22) Filed: Feb. 21, 2008

(51) Int. Cl.
B01D 63/06 (2006.01)
B01D 23/14 (2006.01)
B01D 24/08 (2006.01)
B01D 64/00 (2006.01)

(52) U.S. Cl. .............. 210/321.64; 210/321.87; 210/323.2; 210/455; 210/487; 210/491; 210/493.1; 210/493.5; 210/497.01; 210/500.26; 210/508; 210/509; 210/510.1; 210/502.1; 210/660; 977/811; 977/903

(58) Field of Classification Search ................ None
See application file for complete search history.

(56) References Cited

U.S. PATENT DOCUMENTS

| | | | |
|---|---|---|---|
| 5,895,573 A * | 4/1999 | Scharstuhl | 210/321.87 |
| 6,221,416 B1 * | 4/2001 | Nohren, Jr. | 426/394 |
| 6,569,329 B1 * | 5/2003 | Nohren, Jr. | 210/282 |
| 6,838,005 B2 * | 1/2005 | Tepper et al. | 210/660 |
| 7,390,343 B2 * | 6/2008 | Tepper et al. | 55/527 |
| 2005/0263456 A1 * | 12/2005 | Cooper et al. | 210/660 |
| 2008/0026041 A1 * | 1/2008 | Tepper et al. | 424/445 |

* cited by examiner

Primary Examiner—Krishnan S Menon (57) ABSTRACT

A media in the form of a multilayered semi porous composite membrane containing a strong positive electrical charge with a highly porous surface consisting of 60 to 90 percent void volume and pore size of about 2 micron capable of retaining negatively charged protozoa, bacteria, and virus as well as di-pole particulate matter as a result of the attraction of the positive charge. A housing is a portable adaptive housing containing and supporting the composite membrane. A low pressure stream of water is within the housing and passes through the media. A composite membrane is positioned within the adaptive housing in the path of the low pressure stream of water. The composite membrane is adapted to treat the low pressure stream of water under from 0.3 to 10 psig pressure delivering 5 to 30 ml/sec.

17 Claims, 8 Drawing Sheets

WATER TREATMENT SYSTEM

BACKGROUND OF THE INVENTION

Field of the Invention

There has been a need for individuals to hydrate themselves when away from the convenience of municipal water for some time. Initially, sport bottles and other small containers were employed simply to store and take water away from home. As people became aware of the problems initially of chlorine and later lead that was present in municipally treated water, sport bottles with a variety of different filters were developed and marketed to the consumer for the past fifteen years or more. For the most part they have been effective at removing taste and odor, and in one or more cases heavy metals such as lead and mercury. More recently, a second series of portable products have been introduced to reduce the contamination of protozoa cysts and bacteria. A few may make claims pertaining to bacteria, but under the scrutiny of the test data independently developed by third parties, fail in one or more categories. Typically, virus have proven to be the most difficult as their size prevents conventional filtration by size exclusion. Thus, products incorporating iodinated resin providing an iodine residual have been introduced to the market.

To devitalize the organism with residual iodine requires several minutes of contact time, which is not provided in a Sport Bottle configuration where the user drinks directly from the bottle. Other products using an ultra violet light make excellent claims for bacteria and virus, but neglect the largest of the biological contaminants, protozoa cysts, the most important to the domestic user in the United States and Canada. The UV is not as effective against the heavier shelled protozoa, nor in highly turbid water. Battery life also becomes a consideration as is the quantity of water that may continuously be treated.

These problems are further exasperated by military requirements which must either transport large quantities of treated water prior to dispensing to the canteens of the individual soldier, or use slow and marginally effective means to treat surface waters that may be encountered in the field. To fill the anticipated requirements of the military it becomes a requirement to remove both biological and chemical contaminants, and to the degree possible nuclear contaminants that could be present. A recently developed filtration media termed Charged Layered Membrane Technology circumvents a myriad of problems, most particularly the elimination of most all-biological contamination. For military purposes this is combined with technology know as "Static Filtration" for the removal of chemical and potentially nuclear contaminants.

The deficiencies found in portable filtration devices are now overcome through the use of Charged Layered Membrane Technology, a new type filter normally formed as an accordion pleated closed end cylinder, either structurally independent or enclosed within an out filter body for attachment directly or indirectly to the bottle or canteen top and drinking spout. The uniqueness of this filter is that it consists primarily of Nano glass fibers onto which charged alumina fibers are permanently bonded. The alumina exhibiting a sufficiently strong positive charge potential to attract and hold dipole and negatively charged organisms and particles. As a result the media removes the biological contaminants consisting of protozoa cysts, bacteria, and virus as well as turbid particulate matter when properly applied. In addition this membrane structure may contain activated carbon for the removal of certain chemical species.

Chemical elements adsorbed by activated carbon including chlorine, taste and odor are reduced within the specifications established by NSF meeting the criteria for NSF Standard 42. The carbon content is extremely fine, ~8 micron, and is integrated within the membrane body equaling 30 percent, by weight of the total membrane weight. It is particularly effective as none of the adsorption sites are blinded, not being retained by a polymer binder, as found in the manufacture of carbon block filters. With the charged membrane, using NSF testing protocol, 1500 gallons of prepared 2 ppm chlorine effluent water will pass through 1 $ft^2$ of membrane surface being reduced to less than 0.5 ppm, the NSF standard at a flow exceeding 1 GPM. The encapsulated activated carbon component provides an 800 fold improvement for iodine recovery over a comparable carbon element. The exceptional performance is the result of two unique features. One, the powder is exceptionally fine, 99 percent of the carbon is smaller than 325 sieve size, and 90 percent is smaller than 625 sieve size providing several orders of magnitude more adsorption sites, none of which are blinded.

The charged membrane consists of two layers of heat bonded polyspun scrim containing the body of the membrane with a thickness, not limited to, but ideally between 0.8 mm and 1.1 mm. The contained glass-alumina fiber matrix exhibit the very strong positive charge potential of 50μv which spans the entire pore diameter. The density of the Nano alumina fibers is 2.7 $g/c^3$. The thusly formed membrane assembly has a high absorbent capacity for biological contaminants and turbidity, all contaminants exhibiting a negative or diapole charge potential. The membrane exhibits good absorbent potential in the pH. range of 3-10. The membrane structure is 90 percent void volume and 10 percent solids with a nominal pore size of ~1 micron enhancing the ready flow of water through the membrane. However, each pore contains some 400 individual and independent filtration attraction sites within the membrane core. Flow rates, with a pressure drop of only 0.2 to 0.3 psig, will exceed the flow required in a sport bottle 10 to 30 ml/sec, once wetted. The very small contaminant elements such as bacteria, virus, and fine turbidity, are retained principally by electro adhesion, the result of the positive charge potential within the membrane cross section, rather than physical entrapment upon the surface based upon particle size. The media has a high dynamic response for adsorption, without the use of anion exchange resins, allowing several orders of magnitude of purification within a very shallow bed, and doing so at pressures below 15 psig and at flow rates an order of magnitude or greater than can be achieved with an ultra porous membrane. For instance, a charged membrane filter depth of 1.8 mm will retain 6 LRV of MS2 virus at a flow rate of 10 ml/cm2/min (100 Liters/m2/min). The residence time is about 1 second.

The charged membrane is formed by placing the membrane material, in either or both sheet and accordion pleated form, for increased surface area, over an open supporting grid. Alternatively, a secondary internal molded or non-woven media filter containing complementing capability may be incorporated. The secondary filter is used to remove lead and mercury through the application of ATS, which is available from BASF. Other media for the removal of arsenic, available from BASF, and the elimination of radionuclides may be affected through the use of available polymer extraction technology originally developed by The Los Alamos National Laboratory and licensed from the University of California, the operating contractor, may be applied. The membrane is preferably applied in accordion pleated form, but may be applied in simple cylindrical form with reduced surface area. The membrane ends are potted or molded into the end components to form a sealed unit. In filters with a relatively large base diameter. The base may also be applied as a filtration surface. The basic membrane media is available from Ahlstrom Corporation and is sold under the trade name Disruptor™.

The Static liquid treatment media disposed within the inner body functions differently than the typical hollow block carbon dynamic filter normally used in filtration devices. The media consists of fine non-woven polyester fibers, which are specially treated to permit bonding upon their entire surface a layer of activated carbon, zeolytes, ion exchange resins, or other treatment media in fine powder form in such a manner as to retain the media to the fibers with minimum blinding of the active sites. Functionally, the water being treated is continually in contact with the media. There are voids within the coated fiber matrix containing the water. As the contaminants are removed from the water in contact with the media coated fibers, the remaining contaminants seeking equilibrium migrate into the area adjacent to the fibers and are in turn removed. Thus, the process of contaminant dispersion caused by the search for equilibrium rapidly removes most all of the contaminants from the contained water. No other process is as effective, nor provides the extended residence time that static filtration does given extended residence time. In a portable product the movement of the water within the device further enhances dispersion and contact with the treatment fibers.

In a preferred embodiment the static filtration media comprises a nonwoven mat of a material capable of meeting 21 CFR 177.2260, having a weight of between about 4-7 oz/sq. yd., and a coating comprising about 100-200 percent of the weight of the mat, and including, by weight, or about 60-85 percent activated carbon, about 10-20 percent binder, and about 0-25 percent zeolite. Desirably the static filtration media has been compressed in one dimension about 25-75 percent, e.g. about 40-60 percent, so as to provide a substantially uniform pore size, and has an RDV-IBV ratio of about 0.3-0.8, as measured by the cessation of streaming flow and a porosity of at least 90 percent.

As applied to water treatment devices, when used in conjunction with the charged layered technology, the products are designed to retain sufficient water within the void area of the fiber matrix to satisfy the normal quantity of water removed by drinking at any one instant. This may be referred to as the normal periodic demand cycle.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved water treatment system which has all of the advantages of the prior art water treatment systems of known designs and configurations and none of the disadvantages.

It is another object of the present invention to provide a new and improved water treatment system which may be easily and efficiently manufactured and marketed.

It is further object of the present invention to provide a new and improved water treatment system which is of durable and reliable constructions.

An even further object of the present invention is to provide a new and improved water treatment system which is susceptible of a low cost of manufacture with regard to both materials and labor, and which accordingly is then susceptible of low prices of sale to the consuming public, thereby making such water treatment system economically available to the buying public.

Lastly, it is an object of the present invention to provide a new and improved water treatment system including a media and a housing and a stream of water, the media being in the form of a multilayered semi porous composite sheet, the housing being a portable adaptive housing, and the stream of water being a low pressure stream of water within the housing and through the media with the composite sheet being positioned within the adaptive housing in the path of the low pressure stream of water and the composite sheet adapted to treat the low pressure stream of water for the reduction of biological contaminants consistent with the recommendations of the EPA.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 A-A shows section A-A as specified in FIG. 1 with particular attention to the membrane and base mold.

FIG. 2 AA-AA shows the same cross section as A-A except an optional single closed end carbon or composite media inner supporting filter body is employed, not shown in FIG. 1

FIG. 6, views B-B and C-C, are cross sections of the filter element as shown in FIG. 6.

FIG. 7, view D-D, shows the cross section of the straw shown in FIG. 7.

The same reference numerals refer to the same parts throughout the various Figures.

DESCRIPTION OF THE PREFERRED EMBODIMENT

Figure 1:
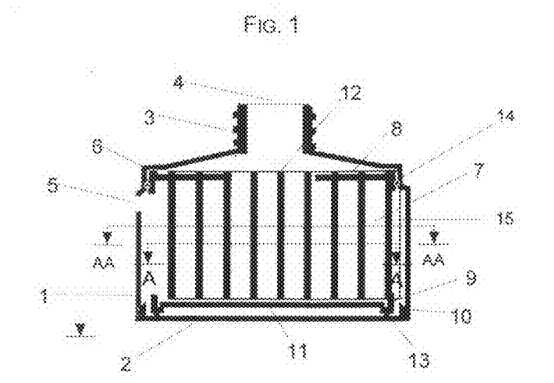
FIG. 1 is a cutaway of the charged membrane filter showing the construction and components.

With reference now to the drawings, and in particular to FIG. 1 thereof, the preferred embodiment of the new and improved water improvement system embodying the principles and concepts of the present invention will be described.

FIG. 1 shows the outer housing 1, with the separate base element 2, snapped into the housing at location 10. The base 2 contains spacing pins 13 to elevate the membrane assembly 7 to provide water access to the base of the filter 11. The base is preferably covered with flat membrane sheeting providing flow up through the base as well as radially as a result of the water access chamber 15. Alternatively, the base 11 may be solid for economy. The filter body 7 is preferably formed with accordion pleats increasing the radial surface area. However, the body 7 may also be formed from straight sheet stock. The filter body 7 is contained between molded sealing ends 8 and 9. The filter assembly 9, 7, and 8 is pressed into the housing 1 forming an "O" ring seal at 14, and welded to the outer housing 1 by means of a raised rib for this purpose 6. The water enters 5 when the bottle is tipped allowing water to flow into the reservoir 15 which in turn forces the water under minimal pressure through the membrane 7. The treated water hence flowing out of the open center of the charged membrane filter assembly at 12 to exit at 4. The housing 1 has threads 12 molded onto the body 1 for attaching to the bottle.

Section A-A is a cross section of the membrane assembly in normal construction. Section AA-AA is a cross section with a secondary media filter contained within.

Figure 2:
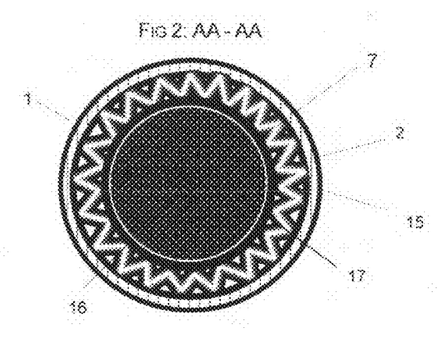

FIG. 2 A-A is a cross section drawing showing the charged membrane 7, formed into an accordion pleated form. In a single media format, the membrane is formed and supported by an inner plastic cage 16, providing strength to resist the radial force of the water being forced through the membrane. The cage 16 also provides axial strength for designs which may choose to have a press fit of the assembled filter to the housing. The base end of the membrane 7 is encapsulated and sealed in (molded in) the end cap 9. A similar end cap is used at the top, as well. The base is preferably a flat sheet of the charged membrane sealed and held in place by the end cap 9. This provides the opportunity to increase the available membrane surface area. For economical reasons the base may be closed by redesigning the plastic end cap 9 to encompass the entire base.

FIG. 2 AA-AA is identical to the preceding description with the exception that a closed base end composite filter 17, replaces the cage 16 of the preceding drawing. This composite filter and its composite base add a secondary filter with varying characteristics such as to remove lead through the inclusion of ATS as supplied by BASF, or PEXT for the removal of radio active matter as produced by (np) Energy Nevada. An activated carbon block filter is also a natural secondary filter if the carbon, or sufficient carbon, is not incorporated within the primary charged membrane 7.

Figure 3:
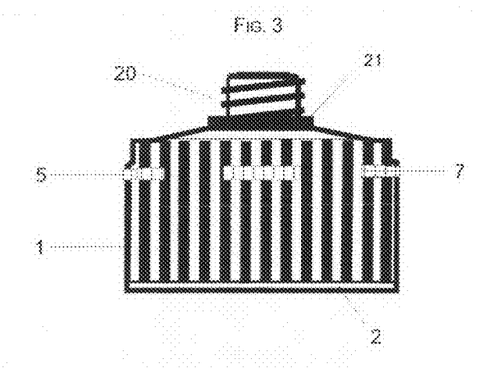
FIG. 3 shows the external view of the filter housing, threaded for mounting to the top of a water container.

FIG. 3 is an assembly drawing of the charged membrane filter, shown as number 22. The housing 1 encapsulates the charged membrane 7 and is sealed in place by the base plate 2. There are four water entry ports 5. The threads 20 are molded into the housing 1. A separate elastomer seal ring 21, is added prior to assembly to the top.

Figure 4:
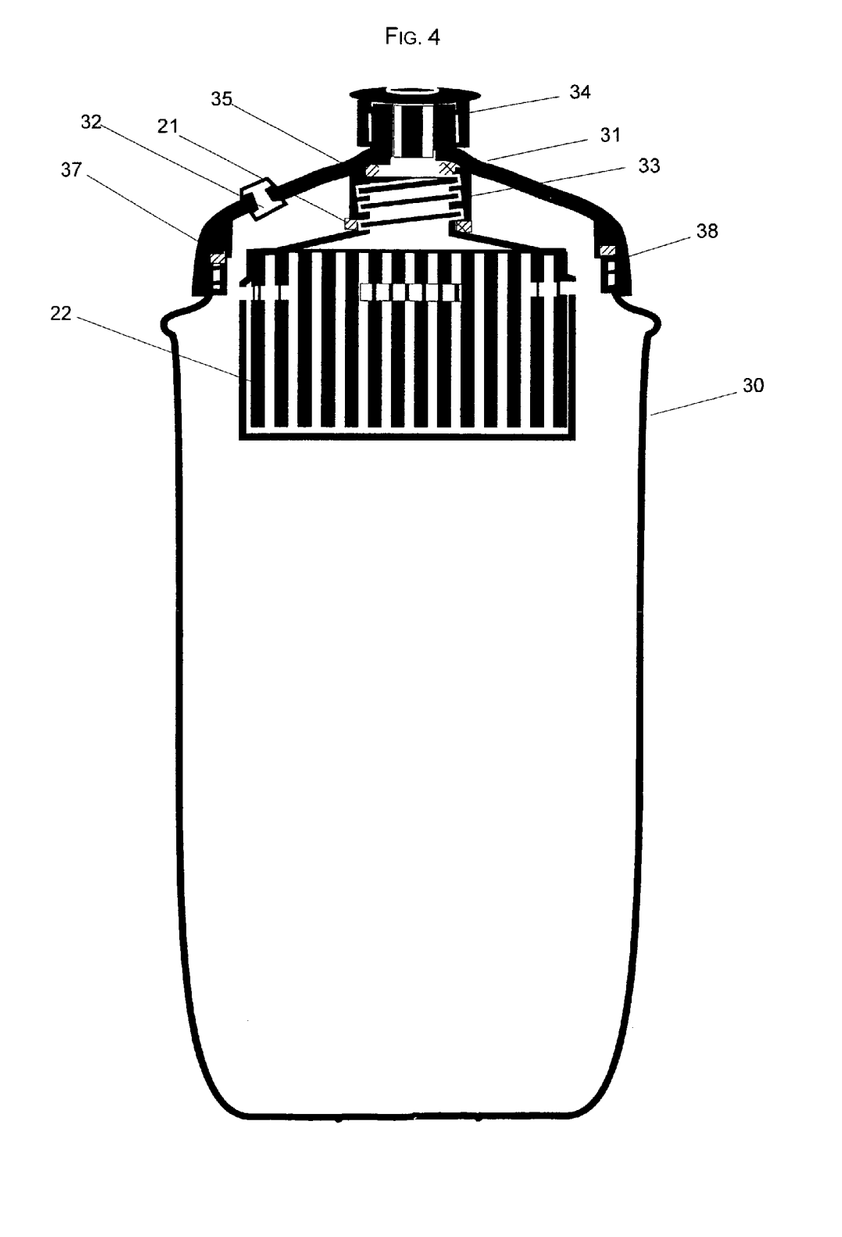
FIG. 4 shows the charged membrane filter assembled into the Bottle Top, which is assembled to a bottle.

FIG. 4 shows a sport bottle with the filter from FIG. 3 installed. The filter 22 is threaded to the top 31 by means of the threads 33. Seals 21 and 35 assure a watertight connection between the filter 22 and top 31. To drink, the high flow valve 34 is elevated, pulled open, and the bottle is tilted. To aid the flow of water, the bottle 30 is squeezed and negative pressure may be added by sucking. The top 31 with the filter 22 assembled is attached to the bottle 30 by the threaded connection 38. A seal 37 assures a secure leak-less assembly between the bottle 30, and top 31, filter 22, assembly. An air relief valve 32 aids in the re-inflation of the bottle without draining water from the filter 22.

Figure 5:
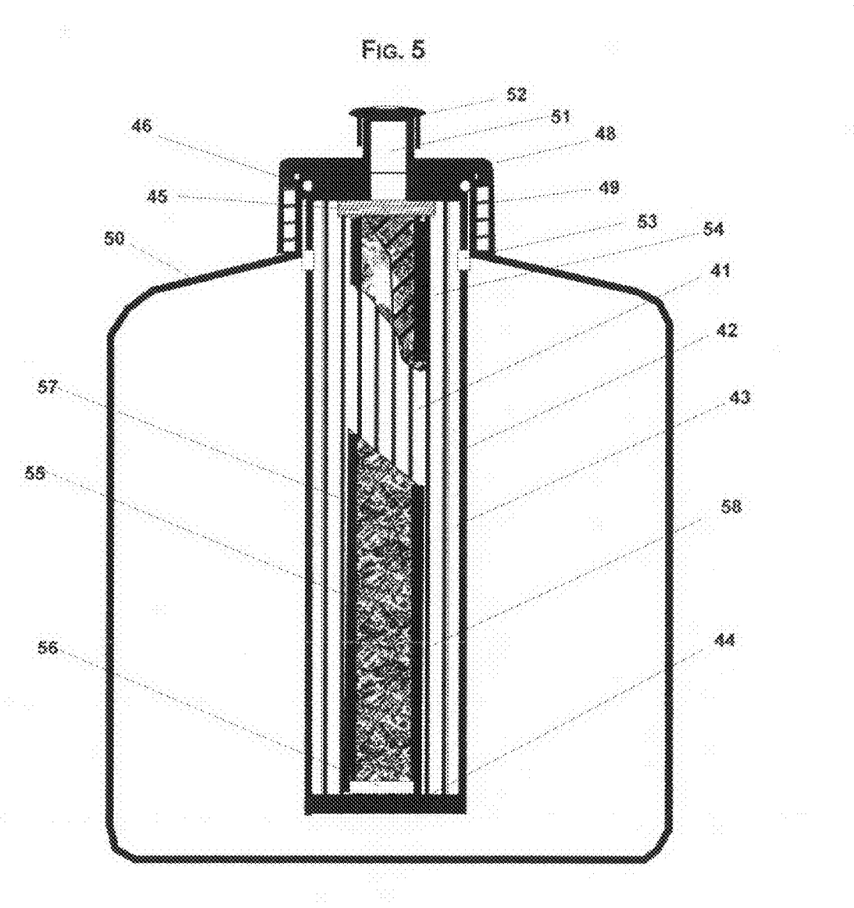
FIG. 5 shows a canteen filter within a canteen employing a flange to integrate the filter with the canteen and canteen top.

FIG. 5 is a charged membrane canteen filter. The canteen filter is made up of the outer housing 42, the accordion pleated charged membrane 41, which is supported internally by the cage 54, and optional static filtration media 41, inside cage 54, and sealed within the tube by end closure 44. Particle filter 45 is employed to catch any fines, which may sluff off the internal static filtration media. The open space between the outer housing 42 and membrane 41 is a water reservoir 43, which delivers the water to the entire membrane surface 41 regardless of the quantity of water within the canteen with equal pressure to the membrane. Water enters the outer housing 42 through the four access ports 53.

Housing 42 is molded integrally with the end cap and mounting top 48 containing "O" ring seal 46. The top bottle closure 48 is molded to provide the water delivery opening 51, closed by the high flow pull-valve 52. The top and filter assembly is threaded to bottle 50 by threads 49 and effectively sealed by "O" ring 46.

As the treated water passes through the charged membrane 41, it enters a flow channel 55, formed between the inner surface of the membrane 41 and inner media housing 58. The treated water is directed by flow channel 55 to the open base 56 of the inner media housing 58. The inner media 57 is of a static filtration nature, and consists of between 60 to 90 percent void volume to be occupied by the water. As the drinking is of an interrupted flow variety, the volume contained within the static filtration media 75 designed to satisfy the normal instantaneous drinking requirement.

Figure 6:
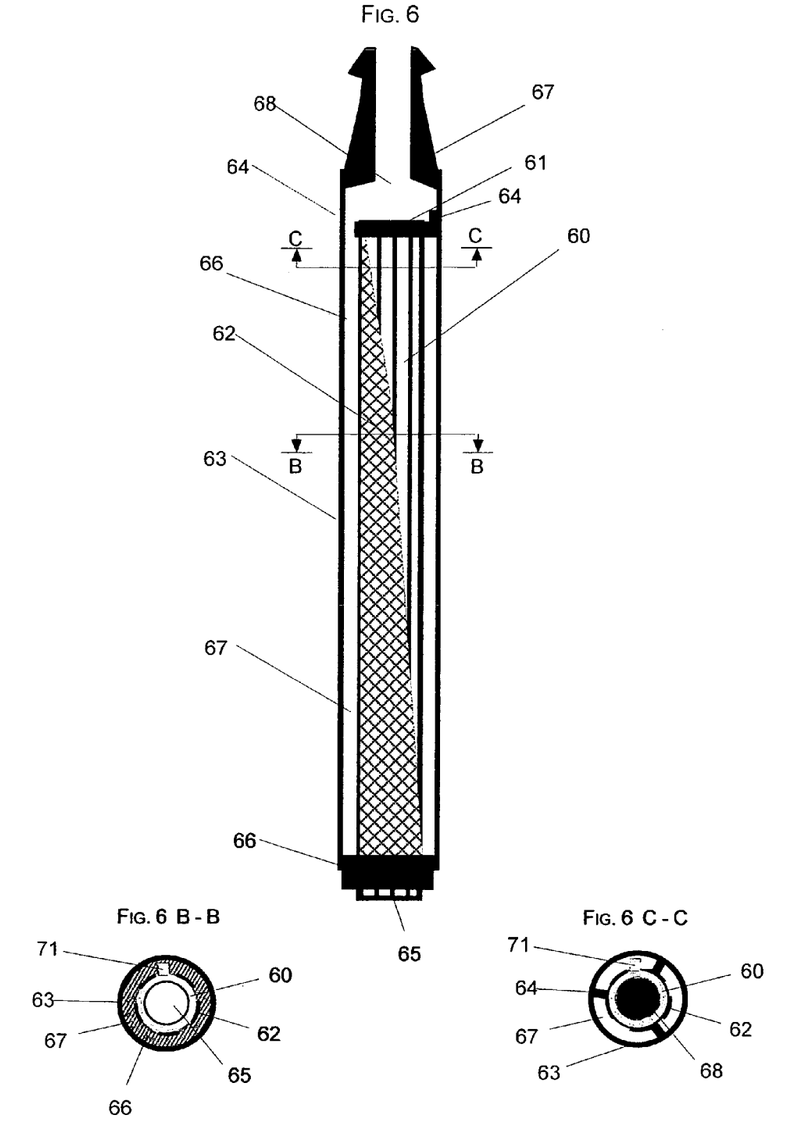
FIG. 6 describes a purity filter straw with inside to outside radial flow used to drink directly from a glass.

FIG. 6 represents the charged membrane purity straw with water flowing from the inside to the outside of the membrane. The purity straw provides to the traveler a small pocketable device that can be used in a glass of water removing the biological contamination that may be present. The purity straw consists of flat rolled membrane sheet 60 contained within outer housing 63. The membrane inner tube 60, is supported externally by the open web 62. The filter tube assembly is centered within the housing 63 at the top by means of offset centering bosses 64 molded into housing 63. The filter assembly is molded into or adhesively bonded to attachment centering and closure ring 66 which forms the base of the treated water chamber 67, when bonded to housing 63 which also seals the treated water chamber 67 from the external source water. The external water to be treated is drawn up into the center of the membrane tube 60 at its open base 65, and is forced out the sidewall of the membrane 60, being closed at the top end 61. The water is forced through the membrane 60 by negative pressure induced by sucking upon the mouthpiece 67, with the water delivered by means of opening 68.

Section B-B is shown in FIG. 7. Section B-B shows a cross section of the charged membrane purity straw. The outer housing 63, is offset from the filter assembly 60 and 62 by support and centering ring 66. Outer housing 63, open web 62, supporting membrane 60 is shown. The open bottom water intake 65 is further shown together with the bonding area 70, forming the membrane sheet into a tube. Section C-C is essentially the same as Section B-B with the exception that it shows the cross section looking up, noting the three bosses 64, integral with the housing 63. Also, the passage for treated water out of the treated water chamber 67, through to the exit path 68. The top end is closed by molded component 61.

Figure 7:
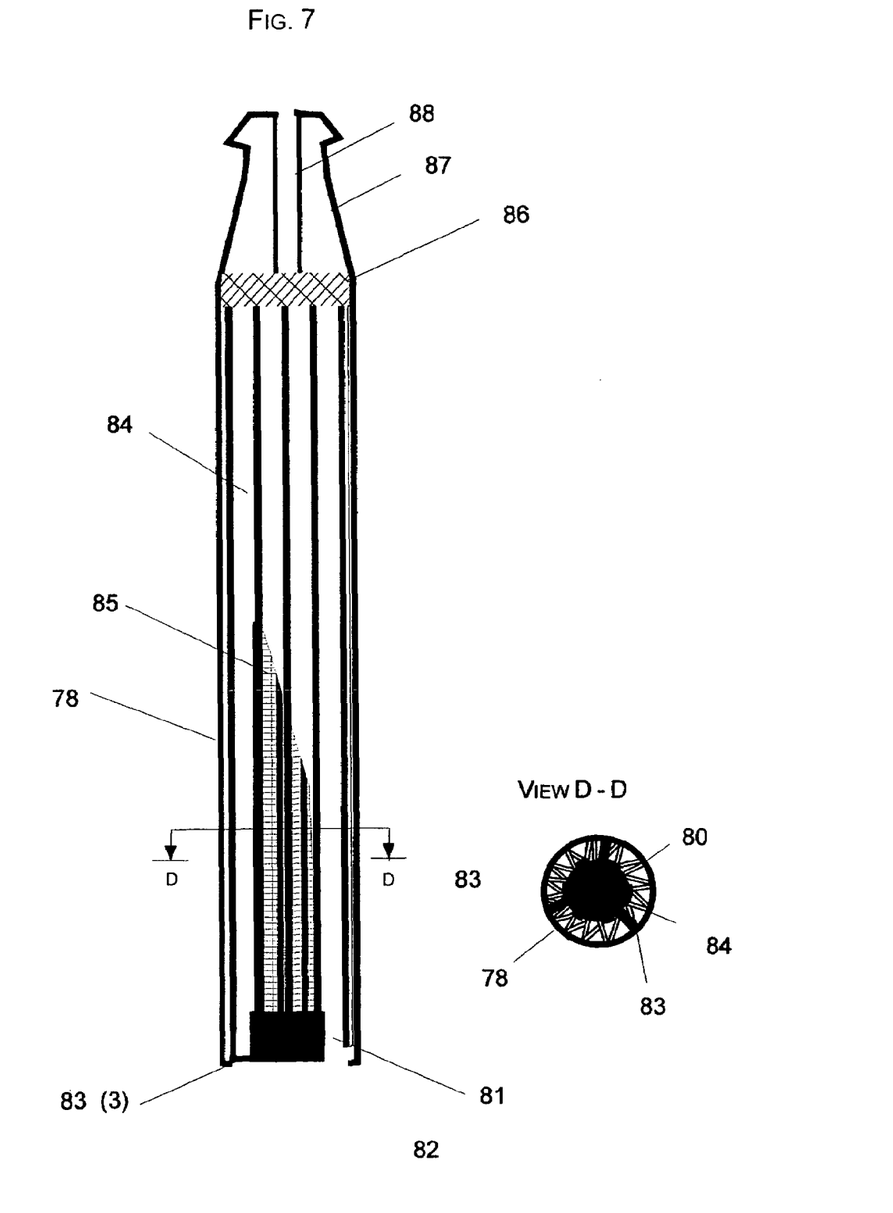
FIG. 7 shows a purity straw with a accordion pleated charged membrane with the water flowing from the exterior surface of the pleated membrane to the inner exit chamber.

FIG. 7, the purity straw, as an option to the design described in FIG. 6, with water flowing from the outside in, consists of an outer housing 78, containing an accordion pleated charged membrane 84, formed into a cylinder configuration, supported by the inner open support cage 85. The base of the membrane 84 and cage 85 is molded into the base plug 82. The base plug 82 has three support legs 83 affixed to the outer housing 78. As shown by section D-D, the opening between the legs 83, forms the water inlet 81 which delivers the water to be treated to the pleated external membrane surface 84. The water is drawn by suction up through the inlet 81, through the membrane 84, into the hollow center 89, and is drawn through the mouthpiece 87 and out the drinking opening 88. The outer housing 78, the charged membrane 84, and the support cage 85 are molded at 86 into the mouthpiece 87.

Figure 8:
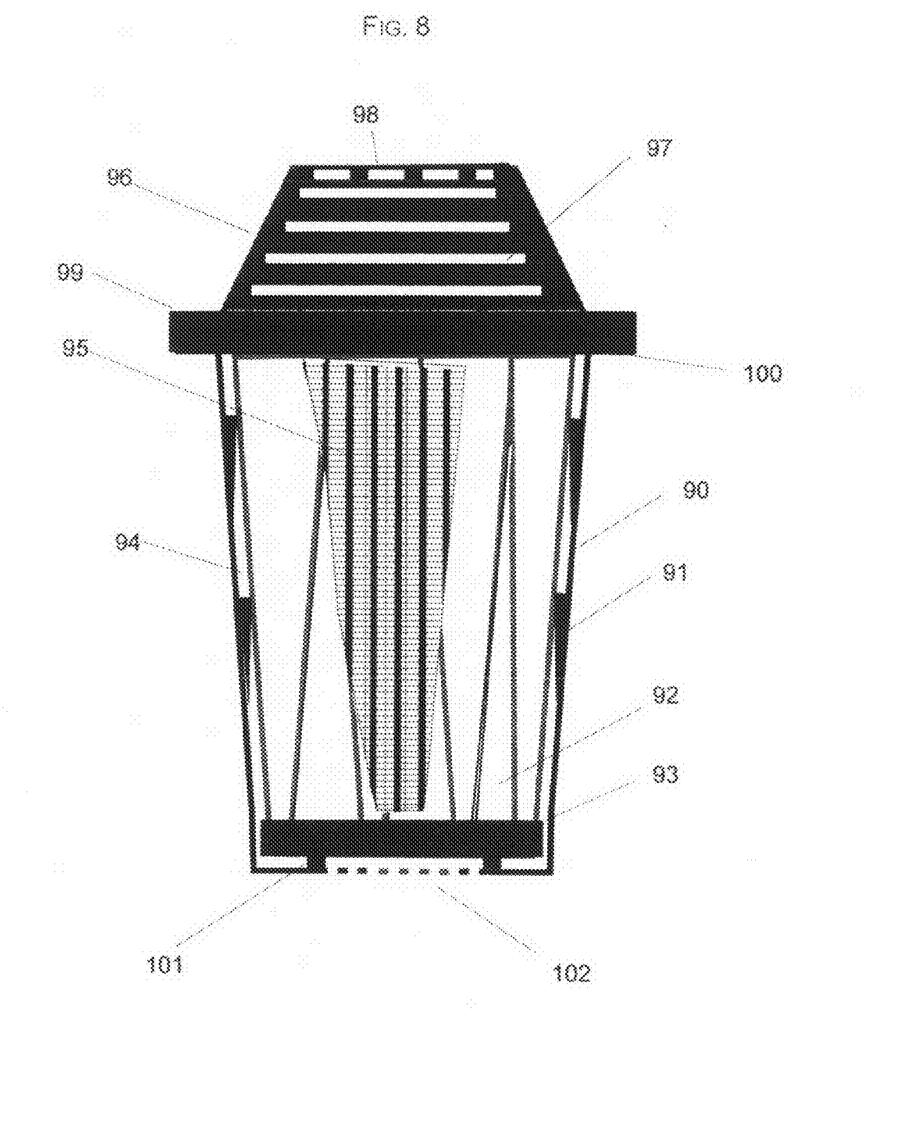
FIG. 8 shows a charged layered membrane filter constructed within a housing for mounting in a typical two reservoir Carafe.

FIG. 8, the carafe water treatment cartridge has the benefit over conventional filter cartridges in flow rate, life expectancy, and the ability to remove biological contaminants. The cartridge delivers treated water moving from the internal to the external surfaces. The cartridge consists of an outer housing 90, with interrupted offsets 91, creating a water path 94, between the outer membrane surface 92. Internally the charged membrane is supported by the open cage 94. The charged membrane 92, and supporting cage 95, are molded into the internal base 93, with standoff legs 101, maintaining the water path 94, permitting the water to exit through water ports 102. The top 96, with inlet water ports 97 and 98 is supported within a carafe by sealing shoulder 100. The outer housing 90, charged membrane 92, and support cage 95 are potted and sealed within the housing 99. If desired a bed of granular media consisting of carbon and ATS, as well as other media may be added.

Figure 9:
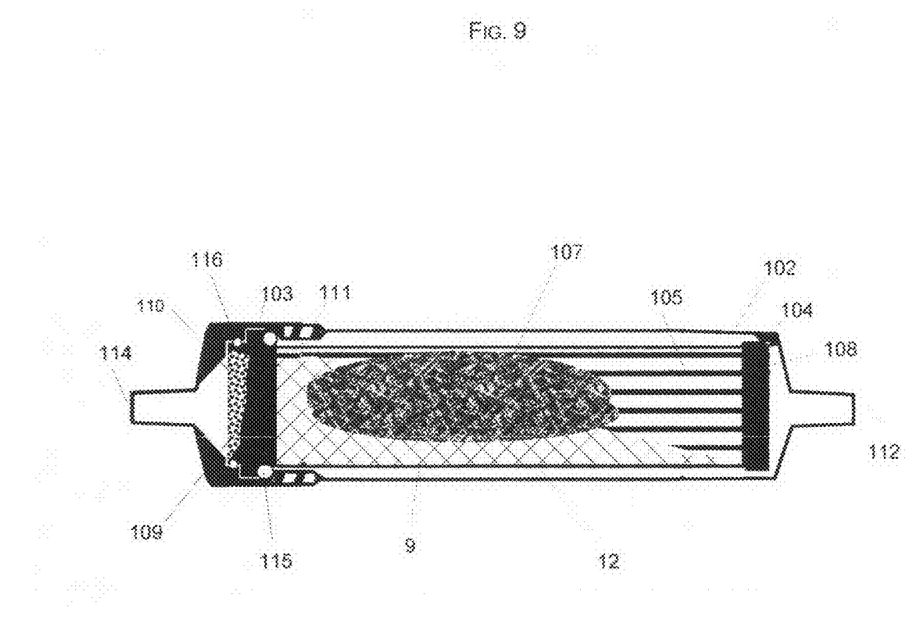
FIG. 9 shows an in-Line water treatment device, which combines both positively charged Nano fibers with activated carbon contained within the outer scrim with an optional inner static filtration media.

FIG. 9 is a cross section and cut away of the internal components of the in-line filter showing, within the housing sections 102 & 103, one of three radially disposed splines 104, molded into the housing 102, to both provide lateral and vertical support to the filter assembly 105. The charged membrane filter 105, is preferably in an accordion pleated configuration. The charged membrane 105, is formed around an inner open core, or cage 106. An optional carbon composite based static filtration material 107 may be inserted, particularly to defeat the threats of chemical agents. This entire assembly is then closed by the membrane end cap 108, which is preferably molded containing the cage 106, and charged layered membrane 105. At the opposite end in housing 109, the membrane 105 and cage 106 are molded in to form a seal and a final carbon fines filter 110 is inserted in the recess formed in the end of 109. The filter assembly is assembled to the end cap 109 and inserted into the housing section 103 by a friction fix with "O" ring 116. The two housing elements 2 and 3 are then assembled with an "O" ring seal 115, and threaded together 111, forming a watertight filtration unit.

The water to be treated enters at hose connection 112. The filter entering at 112, is distributed into water reservoir 113, from which it is drawn by the reduced pressure of suction radially through the charged layered membrane 105, into the optional static filtration bed 107, from which the water flows through the post filter 109 and out the exit hose connection 114.

Figure 10:
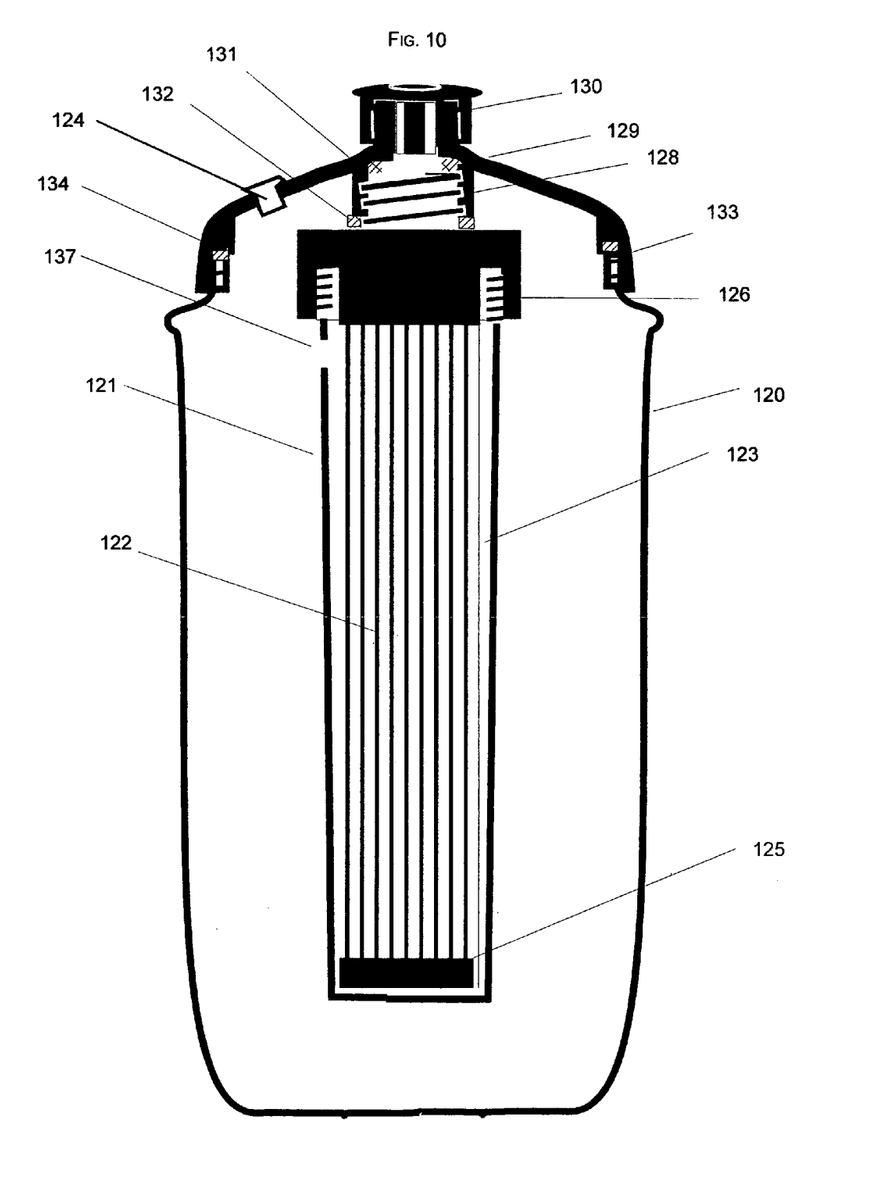
FIG. 10 renders a charged layered membrane filter in a sport bottle configuration employing an internal water receptacle, to retain water in full contact with the Charged Layered Membrane filter, without regard to the water level in the bottle.

FIG. 10 renders a charged layered membrane filter in a sport bottle configuration 120, employing an internal water receptacle 121, to retain water in full contact with the charged layered Membrane filter 123, without regard to the water level in the bottle. An open channel 123, exists between the inner water receptacle 121 and the membrane surface 123 delivering the water to be filtered over the entire membrane surface regardless of water level within the bottle. The water enters the open channel 123 at the four ports 137. The bottle 120, is pliable and may be squeezed to pressurize the water through the charged layered membrane 122. The air relief valve 124, allows the bottle to re-inflate without moving water out of the internal water receptacle 123. The accordion pleated charged layered membrane 122, is enclosed by the molded end cap 125 at the base and by the threaded and mounting end cap 126 at the top end through which the treated water exits the filter. The internal water receptacle 121 threads into the top end cap 126, at 127. The entire filter assembly is threaded 128, into the top 129 with "O" ring or flat seals 131 and 122 installed to preclude leakage bypassing the filter. A pull-push valve 130, is positioned on the top 129. The top and filter assembly is threaded to the bottle 133, with a flat seal 134 installed to prevent leakage under pressure.

From the above descriptions, it should be appreciated that the primary embodiment of the invention is a water treatment system including a media and a housing treating a stream of water. The media is in the form of a multilayered semi porous composite sheet providing a strong positive, some 50μv electrical charge, or zeta potential. The highly porous surface consisting of 60 to 90 percent void volume and pore size of 1-2 micron. The charged layered membrane is capable of retaining negatively charged protozoa, bacteria, and virus as well as di-pole particulate matter as a result of the attraction of the positive charge which spans the port diameter. The membrane, the housing being a portable adaptive housing containing and supporting the composite membrane sheet, and the stream of water being a low pressure stream of water, typically under 10 psig, within the housing and through the media, the composite sheet being positioned within the adaptive housing in the path of the low pressure stream of water, the composite sheet being adapted to treat the low pressure stream of water under from 0.3 to 10 psig pressure delivering 5 to 30 ml/sec for the reduction of biological contaminants consistent with the recommendations of the EPA, the media consisting of two sheets of polymer scrim with Nano glass fibers and bonded Nano alumina fibers encased within the matrix between the scrim sheets, the membrane having a nominal pore size of between one and two microns and from 0.5 to 2 mm in thickness, preferably about 0.8 mm, exhibiting a very high porosity, given a solids content of 40 percent to as little as 10 percent of the membrane volume, yet exposing up to 400 bonding sites within each vertical pore and minimum normal pressure drop of 0.3 to 3 psig, with a flow rate of about 10 ml/sec to about 30 ml/sec., or more prior to fouling. The media also contains within the body of the membrane structure powdered activated carbon effective for the removal of chemical contaminants such as chlorine, as required to qualify for NSF Standard 42, the carbon representing about 30 percent by weight of the membrane, the media being in a cylindrical configuration with an undulating accordion-like cross sectional configuration, the media having a top with egress opening and base closure and the housing being a bottle with a top, and with means to attach the media cooperatively with the bottle for the purpose of treating the water as the water is being removed from the bottle.

It should also be appreciated that from a generic point of view, the invention is a water treatment system including a media and a housing and a stream of water. The media is in the form of a multilayered semi porous composite membrane sheet providing a strong positive, about 50µv, electrical charge, or zeta potential, with a highly porous surface consisting of 60 to 90 percent void volume and pore size of 1-2 micron capable of retaining negatively charged protozoa, bacteria, and virus as well as di-pole particulate matter as a result of the attraction of the positive charge. The housing is a portable adaptive housing containing and supporting the composite sheet. The stream of water is a low pressure stream of water within the housing and through the media. The composite membrane sheet is positioned within the adaptive housing in the path of the low pressure stream of water. The composite membrane sheet is adapted to treat the low pressure stream of water under from 0.3 to over 20 psig pressure but typically 0.3-2 but up to 10 psig when fouled delivering 5 to 30 ml/sec., or greater water flow for the reduction of biological contaminants consistent with the recommendations of the EPA.

In an alternate embodiment, the media, which is the membrane, contains two sheets of polymer scrim with Nano glass fibers and bonded Nano alumina fibers encased within the matrix between the sheets, the membrane having a nominal pore size of between one and two microns and from 0.5 to 2 mm in thickness, preferably about 0.8 mm, exhibiting a very high porosity, given a solids content of 40 percent to as little as 10 percent of the membrane volume, yet exposing up to 400 bonding sites within each vertical pore and minimum pressure drop of 0.3 to 10 psig, with a flow rate of about 10 ml/sec to about 30 ml/sec. or more.

In another embodiment, the media also contains within the body of the membrane structure powdered activated carbon effective for the removal of chemical contaminants such as chlorine as required to qualify for NSF Standard 42. The carbon represents about 30 percent by weight of the membrane.

In an alternate embodiment, the membrane structure is polymer legands for the effective removal of heavy metal contaminants such as lead, arsenic, and radio-nucliades.

In another alternate embodiment, the media requires less than 10 psig to acquire a 30 ml/sec stream of water.

In another embodiment, the media is a unitary body with an egress opening at the top and base closed. A means to connect the unitary body in a leak proof manner cooperatively with a bottle top and bottle is provided for the purpose of treating the water as removed from the bottle.

In another embodiment, the housing is configured as a sport bottle treatment unit and wherein the media is an external charged layered membrane. The membrane is in either sheet or accordion form, with an internal independent monolithic carbon-zeolyte filter of sufficient diameter to maintain an open base to the filtration media for axial flow through the media as well as radial flow from the circumference. This treatment unit is adapted to be either contained within an outer housing or independently, and fastened directly to the bottle top by one fastener chosen from a threaded fit, a friction fit, and a flange which rests on the bottle forming a seal between the bottle and top.

In another embodiment, the housing is configured as a straw for use by an individual to treat water while drinking from a glass. The pressure is exerted by negative pressure caused by sucking on the formed mouth end of the straw. The media is capable of delivering 10-20 ml/sec of water. The straw is adapted to use a charged layered membrane in sheet or accordion pleated form and may be designed to flow the water to be treated either from the outside in and from the inside out.

In another embodiment, the housing is a canteen designed to remove biological contaminants using radial flow combined with a redirected axial flow of the pretreated water into a central compartment containing a static filtration media to treat the water for chemical contaminants, while retaining water within the media bed.

In another embodiment, the media is adapted to be inserted between a water feed tube and exit tube. This is similar to a hydration pack and camp water container. This embodiment allows for direct drinking by the user and also for emptying into a second treated water container. The water is directed to the entire circumferential external surface for transfer radially through the charged layered membrane.

In another embodiment, the media employees an inner static filtration media which the membrane treated water may access, directly or through a redirected channel, to use the full axial length of the inner media.

In another embodiment, the housing is a sport type bottle using a long tubular membrane retained inside a secondary outer housing with water in-let ports at the top. This embodiment provides water access to the entire filtration surface regardless of the amount of water within the bottle or container, and retains water surrounding the charged layered membrane filter.

In another embodiment, the media is self contained and is simply inserted into the filter receptacle designed to place the filter between the reservoirs in a two reservoir carafe or pitcher. The first reservoir of which is raw water. The second reservoir of which is treated water which has passed through the gravity fed charged layered membrane filter positioned between the reservoirs.

In another embodiment, the media may be in a cylindrical configuration with an undulating accordion-like cross sectional configuration.

In another embodiment, the media is in a cylindrical configuration with a circular cross sectional configuration.

In still another embodiment, the media is in a cylindrical configuration with the stream of water being from interior of the media to exterior of the media.

In a final alternate embodiment, the media is in a cylindrical configuration with the stream of water being from exterior of the media to interior of the media.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A water treatment system including a media in the form of a multilayered semi porous composite sheet providing a strong positive electrical charge with a highly porous surface consisting of 60 to 90 percent void volume and pore size of about 2 micron capable of retaining negatively charged protozoa, bacteria, and virus as well as di-pole particulate matter as a result of the attraction of the positive charge, the media containing two sheets of polymer scrim with Nano glass fibers and bonded Nano alumina fibers encased between the sheets, the sheets having a nominal pore size of between one and two microns and from 0.5 to 2 mm in thickness exhibiting a very high porosity, given a solids content of 40 percent to as little as 10 percent of the membrane volume, yet exposing up to 400 bonding sites within each vertical pore and minimum pressure drop of 0.3 to 20 psig, with a flow rate of about 10 ml/sec to about 30 ml/sec;
   a housing being a portable adaptive housing containing and supporting the composite sheet, and
   a stream of water being a low pressure stream of water within the housing and through the media, the composite sheet being positioned within the adaptive housing in the path of the low pressure stream of water.

2. The water treatment system as set forth in claim 1 wherein the media also contains within the body of the membrane structure powered activated carbon effective for the removal of chemical contaminants such as chlorine as required to qualify for NSF Standard 42, the carbon representing about 30 percent by weight of the membrane.

3. The water treatment system as set forth in claim 1 and further including within the membrane structure, polymer legands for the effective removal of heavy metal contaminants such as lead, arsenic, and radio-nucliades.

4. The system as set forth in claim 1 wherein the media requires less than 10 psig to acquire a 30 ml/sec stream of water.

5. The water treatment system as set forth in claim 1 wherein the media is a unitary body with an egress opening at the top and base closed, with means to connect the unitary body in a leak proof manner cooperatively with a bottle top and bottle for the purpose of treating the water as removed from the bottle.

6. The water treatment system as set forth in claim 1 wherein the housing is configured as a sport bottle treatment unit and wherein the media is an external charged layered membrane, in either sheet or accordion form, with an internal monolithic carbon-zeolyte filter of sufficient diameter to maintain and open base to the filtration media for axial flow through the media as well as radial flow from the circumference, this treatment unit being adapted to be contained both within an outer housing and fastened directly to the bottle top by one fastener chosen from a threaded fit, a friction fit, and a flange which rests on the bottle forming a seal between the bottle and top.

7. The water treatment system as set forth in claim 1 wherein the housing is configured as a straw for use by an individual to treat water while drinking from a glass, the pressure being exerted by negative pressure caused by sucking on the formed mouth end of the straw, the media being capable of delivering 10-20 ml/sec of water, the straw adapted to use a Charged layered Membrane in sheet of accordion pleated form and may be designed to flow the water to be treated either from the outside in and from the inside out.

8. The water treatment system as set forth in claim 1 wherein the housing is a canteen designed to remove biological contaminants using radial flow combined with a redirected axial flow of the pretreated water into a central compartment containing a static filtration media to treat the water for chemical contaminants, while retaining water within the media bed.

9. A water treatment system as set forth in claim 1 wherein the media is adapted to be inserted between a water feed tube and exit tube, similar to a hydration pack and camp water container for direct drinking by the user and to empty into a second treated water container, the water being directed to the entire circumferential external surface for transfer radially through the Charged Layered Membrane.

10. A water treatment system as set forth in claim 1 wherein the media employees an inner static filtration media which the membrane treated water may access to use the full axial length of the inner media.

11. A water treatment device as set forth in claim 1 wherein the housing is a sport type bottle using a long tubular membrane retained inside a secondary outer housing with water in-let ports at the top for the purpose of providing water access to the entire filtration surface regardless of the amount of water within the bottle or container, and retaining water surrounding the charged layered membrane filter.

12. The system as set forth in claim 1 wherein the media is self contained and simply inserted into the filter receptacle designed to placed the filter between the reservoirs in a two reservoir carafe or pitcher, the first reservoir of which is raw water, the second treated water which has passed through the gravity fed treatment charged layered membrane filter positioned between the reservoirs.

13. The system as set forth in claim 1 wherein the media is in a cylindrical configuration with an undulating accordion-like cross sectional configuration.

14. The system as set forth in claim 1 wherein the media is in a cylindrical configuration with a circular cross sectional configuration.

15. The system as set forth in claim 1 wherein the media is in a cylindrical configuration with the stream of water being from interior of the media to exterior of the media.

16. The system as set forth in claim 1 wherein the media is in a cylindrical configuration with the stream of water being from exterior of the media to interior of the media.

17. A water treatment system including a media and a housing and a stream of water, the media being in the form of a multilayered semi porous composite sheet providing a strong positive electrical charge with a highly porous surface consisting of 60 to 90 percent void volume and pore size of ~2 micron capable of retaining negatively charged protozoa, bacteria, and virus as well as di-pole particulate matter as a result of the attraction of the positive charge; the membrane, the housing being a portable adaptive housing containing and supporting the composite sheet, and the stream of water being a low pressure stream of water within the housing and through the media, the composite sheet being positioned within the adaptive housing in the path of the low pressure stream of water, the composite sheet being adapted to treat the low pressure stream of water under from 0.3 to 20 psig pressure delivering 5 to 30 ml/sec for the reduction of biological contaminants consistent with the recommendations of the EPA, the media containing two sheets of polymer scrim with Nano glass fibers and bonded Nano alumina fibers encased between the sheets, the sheets having a nominal pore size of between one and two microns and from 0.5 to 2 mm in thickness, exhibiting a very high porosity, given a solids content of 40 percent to as little as 10 percent of the membrane volume, yet exposing up to 400 bonding sites within each vertical pore and minimum pressure drop of 0.3 to 20 psig, with a flow rate of about 10 ml/sec to about 30 ml/sec., the media also containing within the body of the membrane structure powered activated carbon effective for the removal of chemical contaminants such as chlorine, the carbon representing about 30 percent by weight of the membrane, the media being in a cylindrical configuration with an undulating accordion-like cross sectional configuration, the media having a top with egress opening and base closure and the housing being a bottle with a top, and with means to attach the media cooperatively with the bottle for the purpose of treating the water as the water is being removed from the bottle.

* * * * *

US007473362C1

(12) INTER PARTES REEXAMINATION CERTIFICATE (706th)
United States Patent
Nohren, Jr.

(10) Number: US 7,473,362 C1
(45) Certificate Issued: Oct. 18, 2013

(54) WATER TREATMENT SYSTEM

(76) Inventor: John E. Nohren, Jr., St. Petersburg, FL (US)

Reexamination Request:
No. 95/001,573, Mar. 15, 2011

Reexamination Certificate for:
Patent No.: 7,473,362
Issued: Jan. 6, 2009
Appl. No.: 12/070,789
Filed: Feb. 21, 2008

(51) Int. Cl.
*B01D 63/06* (2006.01)
*B01D 24/08* (2006.01)

(52) U.S. Cl.
USPC .............. 210/321.64; 210/321.87; 210/323.2; 210/455; 210/487; 210/491; 210/493.1; 210/493.5; 210/497.01; 210/500.26; 210/508; 210/509; 210/510.1; 210/502.1; 210/660; 977/811; 977/903

(58) Field of Classification Search
USPC ...................................... 210/321.64
See application file for complete search history.

(56) References Cited

To view the complete listing of prior art documents cited during the proceeding for Reexamination Control Number 95/001,573, please refer to the USPTO's public Patent Application Information Retrieval (PAIR) system under the Display References tab.

*Primary Examiner* — Jerry D Johnson (57) ABSTRACT

A media in the form of a multilayered semi porous composite membrane containing a strong positive electrical charge with a highly porous surface consisting of 60 to 90 percent void volume and pore size of about 2 micron capable of retaining negatively charged protozoa, bacteria, and virus as well as di-pole particulate matter as a result of the attraction of the positive charge. A housing is a portable adaptive housing containing and supporting the composite membrane. A low pressure stream of water is within the housing and passes through the media. A composite membrane is positioned within the adaptive housing in the path of the low pressure stream of water. The composite membrane is adapted to treat the low pressure stream of water under from 0.3 to 10 psig pressure delivering 5 to 30 ml/sec.

US 7,473,362 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 4 and 17 are cancelled.

Claims 1, 2, 5, 6, 8, 9 and 12 are determined to be patentable as amended.

Claims 3, 7, 10, 11, 13, 14, 15 and 16, dependent on an amended claim, are determined to be patentable.

New claims 18-32 are added and determined to be patentable.

1. A water treatment system including a media in the form of a multilayered semi porous composite sheet providing a strong positive electrical charge with a highly porous surface consisting of 60 to 90 percent void volume and pore size of about 2 micron capable of retaining negatively charged protozoa, bacteria, and virus as well as di-pole particulate matter as a result of the attraction of the positive charge, the media [containing] *further comprising* two sheets of polymer scrim with Nano glass fibers and bonded Nano alumina fibers encased between the sheets, the sheets having a nominal pore size of between one and two microns and from 0.5 to 2 mm in thickness exhibiting a very high porosity, given a solids content of 40 percent to as little as 10 percent of the membrane volume, yet exposing up to 400 bonding sites within each vertical pore and minimum pressure drop of 0.3 to 20 psig, with a flow rate of about 10 ml/sec to about 30 ml/sec;
    a housing being a portable adaptive housing containing and supporting the composite sheet; and
    a stream of water being a low pressure stream of water within the housing and through the media, the composite sheet being positioned within the adaptive housing in the path of the low pressure stream of water.

2. The water treatment system as set forth in claim 1 wherein the media also contains within the body of the membrane structure [powered] *powdered* activated carbon effective for the removal of chemical contaminants such as chlorine as required to qualify for NSF Standard 42, the carbon representing about 30 percent by weight of the membrane.

5. The water treatment system as set forth in claim 1 wherein the media is a unitary body with an egress opening at the top and *a closed* base [closed], with means to connect the unitary body in a leak proof manner cooperatively with a bottle top and bottle for the purpose of treating the water as removed from the bottle.

6. The water treatment system as set forth in claim 1 wherein the housing is configured as a sport bottle treatment unit and wherein the media is an external charged layered membrane, in either sheet or accordion form, with an internal monolithic carbon-zeolyte filter of sufficient diameter to maintain [and] *an* open base to the [filtration] media for axial flow through the media as well as radial flow from the circumference, this treatment unit being adapted to be contained both within an outer housing and fastened directly to the bottle top by one fastener chosen from a threaded fit, a friction fit, and a flange which rests on the bottle forming a seal between the bottle and top.

8. The water treatment system as set forth in claim 1 wherein the housing is a canteen designed to remove biological contaminants using radial flow combined with a redirected axial flow of the [pretreated] *stream of* water into a central compartment containing a static filtration media to treat the water for chemical contaminants, while retaining water within the *static filtration* media [bed].

9. A water treatment system as set forth in claim 1 wherein the media is adapted to be inserted between a water feed tube and exit tube[, similar to a hydration pack and camp water container] for direct drinking by the user and to empty into a second treated water container, the water being directed to the entire circumferential external surface for transfer radially through the [Charged Layered Membrane] *media*.

12. The system as set forth in claim 1 wherein the media is self contained and simply inserted into the filter receptacle designed to place the filter between the reservoirs in a two reservoir carafe or pitcher, the first reservoir of which is raw water, the second treated water which has passed through the gravity fed treatment [charged layered membrane filter] *media* positioned between the reservoirs.

18. *A water treatment system including:*
    *a charged layer membrane filter media in the form of a multilayered semi porous composite sheet providing a strong positive electrical charge with a highly porous surface consisting of 60 to 90 percent void volume and pore size of about 2 micron capable of retaining negatively charged protozoa, bacteria, and virus as well as di-pole particulate matter as a result of the attraction of the positive charge, the charged layer membrane filter media further comprising two sheets of polymer scrim with Nano glass fibers and bonded Nano alumina fibers encased between the sheets, the sheets having a nominal pore size of between one and two microns and from 0.5 to 2 mm in thickness exhibiting a very high porosity, given a solids content of 40 percent to as little as 10 percent of the charged layer membrane filter media volume, yet exposing up to 400 bonding sites within each vertical pore and minimum pressure drop of 0.3 to 20 psig, with a flow rate of about 10 ml/sec to about 30 ml/sec;*
    *a housing;*
    *a filter housing being a portable adaptive filter housing containing and supporting the composite sheet, the filter housing having a water access chamber in which the composite sheet is contained and supported, the filter housing having water inlets into the water access chamber along the side of the filter housing, the filter housing disposed in the housing; and*
    *a stream of water being a low pressure stream of water within the filter housing and through the charge layer membrane filter media, the composite sheet being positioned within the adaptive filter housing in the path of the low pressure stream of water.*

19. *The water treatment system of claim 18, wherein said water inlets are at a top of said filter housing.*

20. *The water treatment system of claim 19, wherein the housing is a container and wherein the filter housing is connected to a top of the container.*

21. *The water treatment system of claim 20, wherein the charged layer membrane filter media is in a cylindrical configuration and includes an open base;*
    *wherein the filter housing has a closed base and the water access chamber is a water reservoir; and* further comprising a static filtration media disposed interiorly of the charged layer membrane filter media.

22. The water treatment system of claim 21, wherein the cylindrical configuration is a pleated cylindrical configuration.

23. The water treatment system of claim 21, further comprising:
a particulate filter disposed between the static filtration media and the top of the container.

24. The water treatment system of claim 20, wherein the charged layer membrane filter media is in a cylindrical configuration and includes an open base.

25. The water treatment system of claim 24, wherein the cylindrical configuration is a pleated cylindrical configuration.

26. The water treatment system of claim 20, wherein the container includes an air vent.

27. The water treatment system of claim 20, wherein the filter housing is configured to only receive water by the water access chamber when the container is tipped, and further wherein the filter housing is configured to retain received water from the container for a next drinking cycle.

28. The water treatment system of claim 20, wherein the filter housing includes a closed base and spacing pins which elevate the filter media within the water access chamber from the base providing access to the base of the filter media.

29. The system of claim 20, wherein the charged layer membrane filter media is in a cylindrical configuration with an undulating accordion-like cross section.

30. The system of claim 20, wherein the charged layer membrane filter media comprises a membrane structure and wherein the composite sheet contains fine powered activated carbon.

31. A water treatment system including:
a charged layer membrane filter media in the form of a multilayered semi porous composite sheet providing a strong positive electrical charge with a highly porous surface consisting of 60 to 90 percent void volume and pore size of about 2 micron capable of retaining negatively charged protozoa, bacteria, and virus as well as di-pole particulate matter as a result of the attraction of the positive charge, the charged layer membrane filter media further comprising two sheets of polymer scrim with Nano glass fibers and bonded Nano alumina fibers encased between the sheets, the sheets having a nominal pore size of between one and two microns and from 0.5 to 2 mm in thickness exhibiting a very high porosity, given a solids content of 40 percent to as little as 10 percent of the charged layer membrane filter media volume, yet exposing up to 400 bonding sites within each vertical pore and minimum pressure drop of 0.3 to 20 psig, with a flow rate of about 10 ml/sec to about 30 ml/sec;
a housing;
a filter housing being a portable adaptive filter housing containing and supporting the composite sheet, the filter housing having a water access chamber in which the composite sheet is contained and supported, the filter housing disposed in the housing;
a stream of water being a low pressure stream of water within the filter housing and through the charge layer membrane filter media, the composite sheet being positioned within the adaptive filter housing in the path of the low pressure stream of water; and
wherein the housing is configured as a drinking straw include a mouth piece, a treated water passage and an open base through which water may axially flow through the filter media and into the treated water passage and then out of the mouth piece.

32. A water treatment system including:
a charged layer membrane filter media in the form of a multilayered semi porous composite sheet providing a strong positive electrical charge with a highly porous surface consisting of 60 to 90 percent void volume and pore size of about 2 micron capable of retaining negatively charged protozoa, bacteria, and virus as well as di-pole particulate matter as a result of the attraction of the positive charge, the charged layer membrane filter media further comprising two sheets of polymer scrim with Nano glass fibers and bonded Nano alumina fibers encased between the sheets, the sheets having a nominal pore size of between one and two microns and from 0.5 to 2 mm in thickness exhibiting a very high porosity, given a solids content of 40 percent to as little as 10 percent of the charged layer membrane filter media volume, yet exposing up to 400 bonding sites within each vertical pore and minimum pressure drop of 0.3 to 20 psig, with a flow rate of about 10 ml/sec to about 30 ml/sec;
a housing;
a filter housing being a portable adaptive filter housing containing and supporting the composite sheet, the filter housing having a water access chamber in which the composite sheet is contained and supported, the filter housing disposed in the housing;
a stream of water being a low pressure stream of water within the filter housing and through the charge layer membrane filter media, the composite sheet being positioned within the adaptive filter housing in the path of the low pressure stream of water; and
the housing is configured as a drinking straw including a mouth piece, a water inlet passage and an open base through which water may flow into the water inlet and radially through the filter media and then out of the mouth piece.

* * * * *